(12) United States Patent
Häggander et al.

(10) Patent No.: US 6,318,071 B2
(45) Date of Patent: Nov. 20, 2001

(54) CONTROLLED TEMPERATURE ROCKET NOZZLE

(75) Inventors: Jan Häggander, Trollhattan; Lars-Olof Pekkari, Ytterby, both of (SE)

(73) Assignee: Volvo Aero Corporation, Trollhättan (SE)

( * ) Notice: Subject to any disclaimer, the term of this patent is extended or adjusted under 35 U.S.C. 154(b) by 0 days.

(21) Appl. No.: 09/066,331
(22) PCT Filed: Sep. 23, 1996
(86) PCT No.: PCT/SE96/01178
§ 371 Date: Jul. 7, 1998
§ 102(e) Date: Jul. 7, 1998
(87) PCT Pub. No.: WO98/12429
PCT Pub. Date: Mar. 26, 1998
(51) Int. Cl.[7] ....................................... F02K 1/00
(52) U.S. Cl. ........................................ 60/271; 239/265.11
(58) Field of Search ................ 60/267, 271; 239/265.11

(56) References Cited

U.S. PATENT DOCUMENTS

| | | | |
|---|---|---|---|
| 3,394,549 | 7/1968 | Sutor | 60/271 |
| 3,423,942 * | 1/1969 | Spindler | 60/207 |
| 3,925,982 * | 12/1975 | Mueller | 60/271 |
| 4,434,614 * | 3/1984 | Gill et al. | 60/271 |
| 4,947,644 | 8/1990 | Hermant | 60/257 |

FOREIGN PATENT DOCUMENTS

897568 * 7/1949 (DE) .............. 239/265.11

* cited by examiner

Primary Examiner—Charles G. Freay
(74) Attorney, Agent, or Firm—Ostrolenk, Faber, Gerb & Soffen, LLP

(57) ABSTRACT

A rocket nozzle having an axial double bell shape. The nozzle includes a first bell shape, a second bell shape and an inflection point where the first bell shape and the second bell shape meet. The inflection point is located between a location at the area ratio $\epsilon=10$ and a location at $0.85 \times \epsilon_{max}$ of the nozzle, where $\epsilon$ is the narrowest cross-sectional area of the nozzle. The first bell shape and the second bell shape both have a contour line having an outwardly directed curvature of between 2 and 7 at the inflection point.

12 Claims, 2 Drawing Sheets

CONTROLLED TEMPERATURE ROCKET NOZZLE

FIELD OF THE INVENTION

The present invention provides a rocket nozzle having an axially double bell shape, that is, a so-called "Dual Bell" type, and having an outwardly directed change of curvature of the contour line or generatrix at the inflection point between the two bell shapes.

BACKGROUND OF THE INVENTION

The Dual Bell shape of rocket nozzles is known from the early 60's for providing an altitude compensation. In sea level operation mode of such a Dual Bell nozzle, the inflection point will force the flow to separate from the nozzle wall at the desired location, thus increasing sea level thrust. In altitude operation mode, the plume gradually expands until it finally attaches to the nozzle wall downstream of the inflection point. In reality, however, the Dual Bell nozzle concept has several inherent inefficiencies which reduce its performance from the theoretical optimum.

On the other hand, the function of the rocket nozzle is to expand and accelerate the gas to high velocity, and thereby give thrust efficiency and payload capacity. The thrust efficiency is especially important to upper rocket stages. High thrust performance means high wall temperatures and as a consequence leads to exotic and expensive technologies. The temperature of the walls of a rocket nozzle is dependent on the pressure at the wall and the speed of the flow at the wall.

For controlling the wall temperature of a rocket nozzle, particularly wall portions which are not actively cooled by convection cooling, several techniques have been suggested. First of all, the materials used are to have strength at very high temperatures, which of course is expensive. The nozzle walls also may be covered by coatings that insulate and allow high surface temperatures. This is also expensive. Finally, a cooling film might be used in combination with a continuous nozzle contour.

In the case of using metallic materials, such materials have high cost and a nozzle structure must be built with many joints due to the material availability. The large number of joints, however, lowers the reliability. Alternatively, a ceramic matrix composite material may be used. In this case, the cost is very high and the reliability might be questioned due to little experience for application in rocket nozzles.

Thus, coatings add cost and the potential to lower the steady state temperature is limited. A coating also means reduced reliability due to increased complexity. As to the case of film cooling, there is normally no gas to produce film available for closed cycle engines. Tapping of gas for film cooling purposes would mean serious performance lose.

SUMMARY OF THE INVENTION

It has now turned out that a simple and inexpensive way to obtain a control of the temperature of the nozzle walls might be obtained based on the Dual Bell shape but adapted as suggested according to the present invention. The invention thus is substantially distinguished in that for obtaining an improved cooling action on the nozzle wall the change of curvature amounts to between 2° and 7°. The said inflection point (I) is located between a location at the area ratio $\epsilon=10$ and a location at $0.85 \times \epsilon_{max}$ of the nozzle.

By introduction of a discontinuity in the meridional plane for a nozzle contour the wall temperature will be lowered faster than what would be the case for the normal continuous contour. The temperature of the nozzle wall from the point of the discontinuity is made close to constant. The temperature that decides the nozzle material, therefore, is lowered. As a side effect, by introduction of a discontinuity the behaviour of a cooling film could be controlled. At the inflection point the film close to the nozzle wall will be subjected to a sudden acceleration just downstream of the discontinuity which will stabilise the film and prevent mixing. The efficiency of the film is then maintained.

BRIEF DESCRIPTION OF THE DRAWINGS

The invention will be further described below by way of example with reference to the accompanying drawings in FIG. 1 is a longitudinal section of a nozzle shape according to the present invention, the left half of which illustrates a location of the inflection point I at a location $\epsilon=10$ while the right half illustrates a location of the inflection point I at $\epsilon=85$ percent of $\epsilon_{max}$.

DETAILED DESCRIPTION OF THE INVENTION

Figure 1:
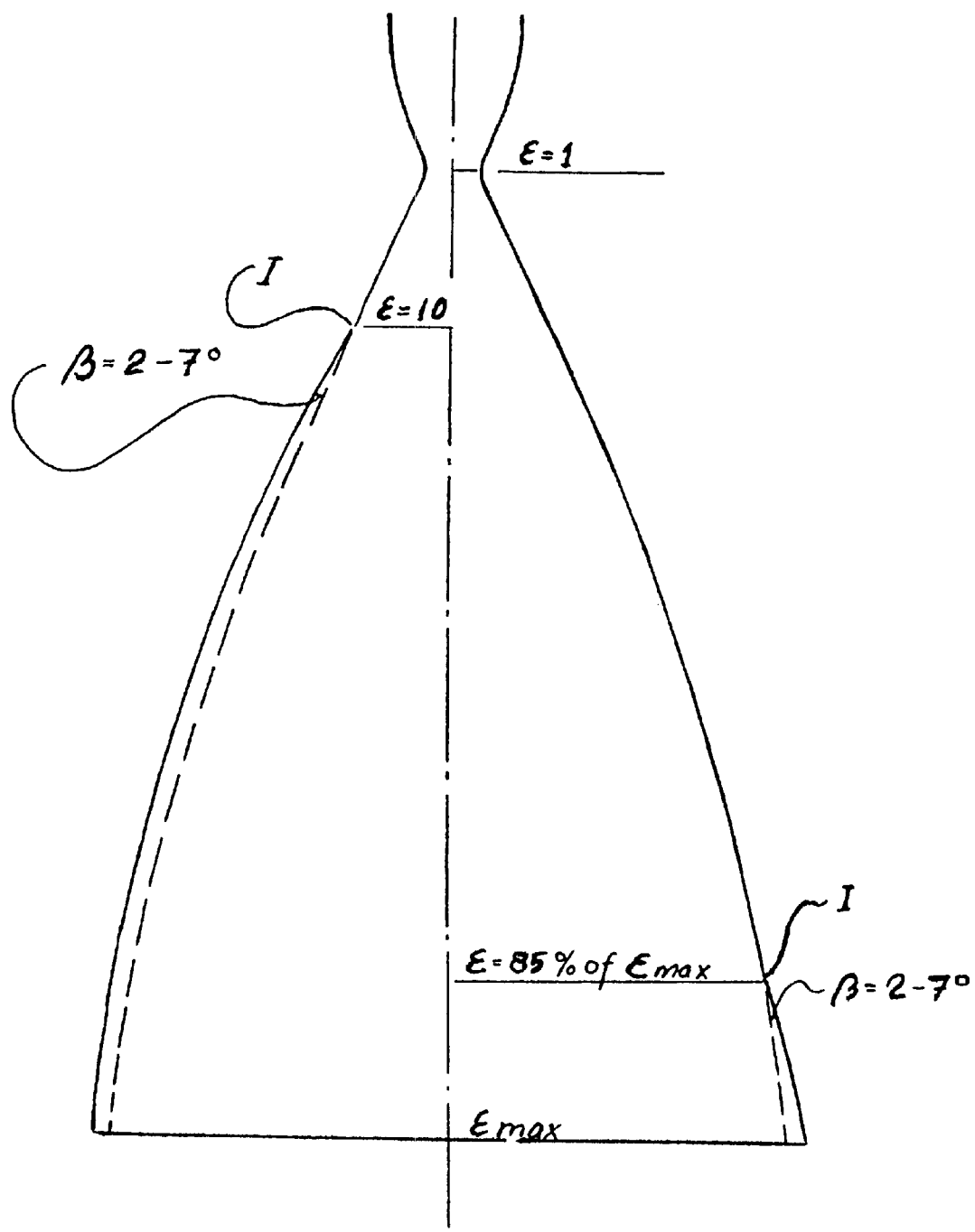
Figure 2:
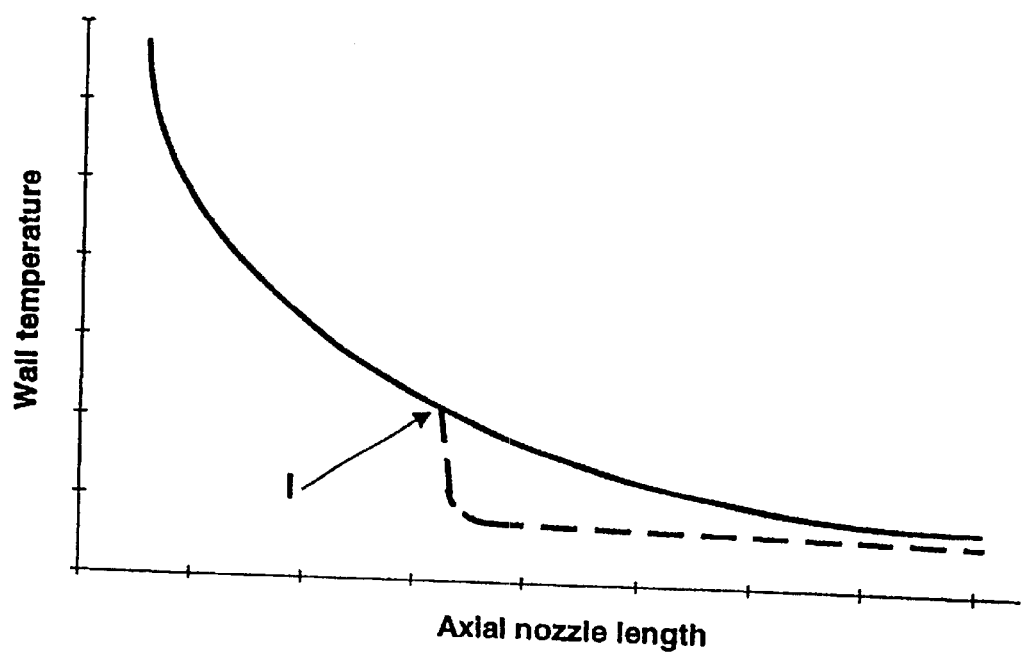
FIG. 2 shows the curve of the relation between wall temperature and axial length of the nozzle according to the invention.

In FIG. 1 it is thus illustrated a rocket nozzle 1 of so-called "Dual Bell" type, i.e. having an axially double bell shape. Similar to well-known altitude compensating nozzle structures there is an inflection point I on the contour line or generatrix where there is a sudden change in the curvature of the contour line, in other words where the upper bell shape changes to the further bell shape next thereto. Unlike the known Dual Bell structures where the change of curvature amounts to at least 9° in order to provide for a sudden direction change for obtaining the desired separation of the flow along the nozzle wall at the inflection point, the present invention suggests that the change of curvature amounts to only between 2 and 7°. The inflection point I is located between a location at the area ratio $\epsilon=10$ and the location at $0.85 \times \epsilon_{max}$ of the nozzle. $\epsilon$ is the area ratio which amounts to $\epsilon=1$ at the throat of the nozzle.

According to the present invention, the inflection point might be located at any suitable location between the two stipulated limits stated above.

The sudden acceleration of the film flow along the wall caused by the change of curvature of the wall contour line provides for an improved cooling effect starting immediately downstream of the inflection point and maintaining the effect to such an extent that the rest of the wall downstream of the inflection point will be kept almost constant. The reduced wall temperature thus allows the use of a wall material not at all as temperature resistant as requested in prior art and consequently a cheaper structure.

What is claimed is:

1. A rocket nozzle having an axial double bell shape for controlling a wall temperature of the rocket nozzle, the rocket nozzle comprising;

a first bell shape;

a second bell shape downstream of the first bell shape; and an inflection point where the first bell shape and the second bell shape meet, the wall temperature being controlled by the inflection point located between a location at the area ratio $\epsilon=10$ and a location at $0.85 \times \epsilon_{max}$ of the nozzle, where $\epsilon=1$ is the narrowest cross-sectional area of the nozzle; and by the curvature between the first bell shape and the second bell shape changing outwardly directed between 2 degrees and 7 degrees at the inflection point, wherein cooling is provided downstream of the inflection point by the change of curvature, and no active cooling is provided.

2. The rocket nozzle according to claim 1, wherein the rocket nozzle is all upper stage nozzle.

3. A rocket nozzle having an axial double bell shape for controlling a wall temperature of the rocket nozzle, the rocket nozzle comprising:

a first bell shape;

a second bell shape downstream of the first bell shape;

an inflection point where the first bell shape and the second bell shape meet, the inflection point being located between a location at the area ratio $\epsilon=10$ and a location at $0.85\times\epsilon_{max}$ of the nozzle, where $\epsilon=1$ is the narrowest cross-sectional area of the nozzle; and means for cooling the rocket nozzle, wherein the cooling means comprises on the second bell shape an outwardly directed change in curvature of between 2 degrees and 7 degrees at the inflection point, whereby a wall temperature of the nozzle downstream of the inflection point is reduced sufficiently to allow use of a wall material less temperature resistant than would be required without the outwardly directed curvature change.

4. The rocket nozzle according to claim 3, wherein the rocket nozzle is an upper stage nozzle.

5. The rocket nozzle according to claim 4, wherein the nozzle is cooled by radiation and wherein no active cooling is provided.

6. The rocket nozzle according to claim 4, wherein the outwardly directed curvature change provides the means for cooling the nozzle and wherein no active cooling is provided.

7. A rocket nozzle having an axial double bell shape for controlling a wall temperature of the rocket nozzle, the rocket nozzle comprising:

a first bell shape; and a second bell shape downstream of the first bell shape;

wherein an inflection point is provided where the first bell shape and the second bell shape meet, the inflection point being located between a location at the area ratio $\epsilon=10$ and a location at $0.85\times\epsilon_{max}$ of the nozzle, where $\epsilon=1$ is the narrowest cross-sectional area of the nozzle, the inflection point providing means for cooling the rocket nozzle, wherein the cooling means comprises on the first bell shape and the second bell shape a discontinuity in the meridional plane of a contour of the nozzle whereby the curvature between the first bell shape and the second bell shape changes outwardly directed between 2 degrees and 7 degrees at the inflection point, the discontinuity providing the means of cooling the nozzle, and wherein no active cooling is provided.

8. The rocket nozzle according to claim 7, wherein the discontinuity comprises an outwardly directed change in curvature of between 2 degrees and 7 degrees at the inflection point.

9. The rocket nozzle according to claim 7, wherein the rocket nozzle is an upper stage nozzle.

10. The rocket nozzle according to claim 9, wherein the nozzle is cooled without active cooling.

11. A method for cooling a rocket nozzle, the method comprising:

providing the nozzle with a first bell shape;

providing the nozzle with a second bell shape; and cooling the nozzle by providing the nozzle with an inflection point where the first bell shape and the second bell shape meet, the inflection point being located between a location at the area ratio $\epsilon=10$ and a location at $0.85\times\epsilon_{max}$ of the nozzle, where $\epsilon=1$ is the narrowest cross-sectional area of the nozzle, wherein from the first bell shape to the second bell shape a contour line changes outwardly between 2 degrees and 7 degrees at the inflection point.

12. The method of claim 11, wherein the step of cooling the nozzle is performed without active cooling.

* * * * *